C. EKSTRAND, DEC'D.
M. EKSTRAND, EXECUTRIX.
APPARATUS FOR TREATING OIL.
APPLICATION FILED NOV. 21, 1917.

1,388,415. Patented Aug. 23, 1921.
7 SHEETS—SHEET 1.

INVENTOR:
Charles Ekstrand
By Attorneys,
Fraser, Durk & Myers

C. EKSTRAND, DEC'D.
M. EKSTRAND, EXECUTRIX.
APPARATUS FOR TREATING OIL.
APPLICATION FILED NOV. 21, 1917.

1,388,415.

Patented Aug. 23, 1921.
7 SHEETS—SHEET 4.

Fig. 7.

WITNESS:
Rene Bruine

INVENTOR:
Charles Ekstrand,
By Attorneys,
Fraser, Durke & Myers

C. EKSTRAND, DEC'D.
M. EKSTRAND, EXECUTRIX.
APPARATUS FOR TREATING OIL.
APPLICATION FILED NOV. 21, 1917.

1,388,415.

Patented Aug. 23, 1921.

WITNESS:
René Bruine

INVENTOR:
Charles Ekstrand,
By Attorneys,
Fraser, Jurk & Myers

C. EKSTRAND, DEC'D.
M. EKSTRAND, EXECUTRIX.
APPARATUS FOR TREATING OIL.
APPLICATION FILED NOV. 21, 1917.

1,388,415.

Patented Aug. 23, 1921.
7 SHEETS—SHEET 6.

WITNESS:
René Bruine

INVENTOR:
Charles Ekstrand,
By Attorneys,
Fraser, Junk & Myers,

Fig. 16.

UNITED STATES PATENT OFFICE.

CHARLES EKSTRAND, OF BROOKLYN, NEW YORK; MABEL EKSTRAND EXECUTRIX OF SAID CHARLES EKSTRAND, DECEASED.

APPARATUS FOR TREATING OIL.

1,388,415.　　　　　Specification of Letters Patent.　　Patented Aug. 23, 1921.

Application filed November 21, 1917. Serial No. 203,085.

*To all whom it may concern:*

Be it known that I, CHARLES EKSTRAND, a citizen of the United States of America, residing in the borough of Brooklyn, city of New York, county of Kings, and State of New York, have invented certain new and useful Improvements in Apparatus for Treating Oil, of which the following is a specification.

This invention relates generally to the treatment of oil and is particularly directed to carrying out the process known in the trade as "cracking oil", although the apparatus illustrated was designed with a view of its adaptability to carrying on other processes, as, for instance, use as a topping still, and for drying various oils and hydrocarbon substances, as, for instance, the well-known and annoying substance (which can hardly be dignified with the appellation of an oil product), which consists of the viscous oil refuse so mixed with water that their separation with the apparatus ordinarily present in oil-treating plants is very tedious and expensive.

The invention can best be described by reference to the accompanying drawings, showing a practicable plant erected for carrying out the process claimed herein and which plant embodies also the apparatus made the subject of the claims directed to that portion of the invention, in which drawings—

Figure 1 is a vertical longitudinal section through the retorts and expansion chamber stack;

Fig. 1ª is the broken-off top portion of the stack and illustrates the upper portion of the expansion chamber;

Fig. 2 is a vertical section of the lower portion of the expansion chamber taken at about right angles to the showing in Fig. 1 and somewhat enlarged for the purpose of more clearly illustrating certain of the details therein contained;

Fig. 3 is a horizontal section of the retorts and stack taken at about the plane of the line 3—3 of Fig. 1 and looking downwardly, the plane of section of Fig. 1 being shown in Fig. 3 by the line 1—1, looking in the direction of the arrow;

Fig. 4 is a horizontal section of the stack taken on a plane at about the line 4—4 of Fig. 1, looking downwardly;

Fig. 5 is an enlarged section of the lower ends of the retort tubes;

Fig. 5ª shows a detail of the bends provided with flanged connections for recording thermometers, pressure gages, etc.;

Figures 6, 8, 9, 10:
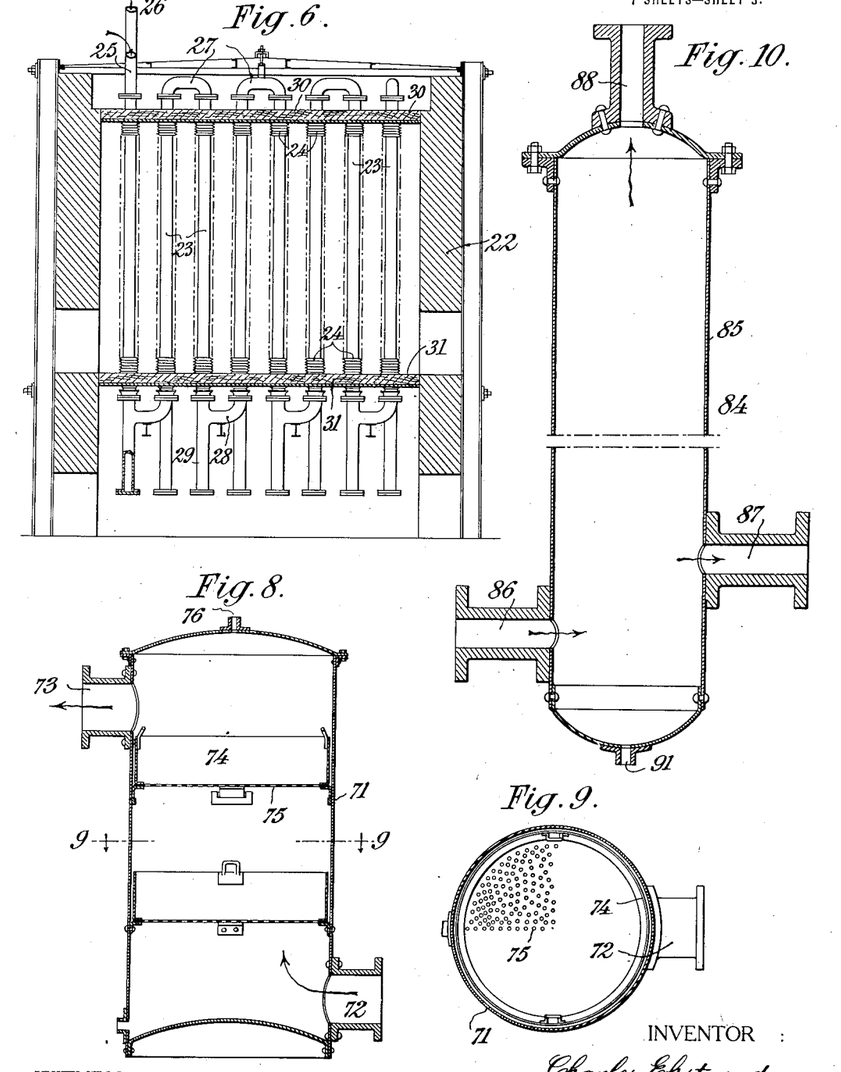
Fig. 6 is a cross-section of the retorts taken on a plane at about the line 6—6 of Fig. 3 and looking toward the furnace end, as indicated by the arrows.
Fig. 8 is a central vertical section of a scrubber.
Fig. 9 is a horizontal section of the scrubber shown in Fig. 8 taken on a plane at about the line 9—9 thereof.
Fig. 10 is a central vertical section of a separator.

The heat for the retort is furnished by some suitable fire; this device being primarily intended for oil, oil is the most logical fuel to employ, the brickwork of the retorts showing the portions of an oil-burning furnace having three furnace or fire chambers 20 (Fig. 1) opening into a common arched chamber 21 which communicates with the heat chamber 22 of the retorts. Other fuel, as coal or gas, can equally well be used instead of oil. Such heat chamber affords a sinuous passage for the fire, and the retort tubes form a sinuous passage for the material being operated upon. In the present illustration the flow of material is in a direction opposite to the passage of the fire. The retort tubes 23 in the installation depicted in the present illustration are, by way of example, four-inch cold-drawn steel tubing having welded flanges at the respective ends, the tubes shown being twelve feet from face to face of flanges; but any size or kind of tubes may be used. The portion of each tube which is located within the heat chamber is covered with cast-iron grooved rings 24. These rings serve to absorb the heat and communicate the same to the tubes and the material passing through them. In the present illustration there are ninety-six such tubes arranged in series, the point of entrance for the oil under treatment being indicated at the arrow 25 and the point of exit at the arrow 26. It, of course, is to be understood that the upper and lower ends of the tubes 23 are connected by suitable bends 27, 28, respectively (Fig. 6). These bends are preferably formed of cast steel and the bend 28 at the lower end has a Y-formation (Fig. 5), the leg 29 of the Y being substantially in alinement with the tube 23 through which the material flows downwardly, thereby constituting a trap below each downward pipe for the accumulation or trapping of any free carbon which may develop during this period of the process, which, on account of its greater weight, will drop down into the leg of the Y and remain there, the fluid turning and flowing upwardly in the next tube. The flanges and bends of the tubes are protected at the top and bottom by heat-insulating walls 30, 31, respectively, and the upper bends are preferably covered by a plate 30' for preventing radiation.

Figures 3, 4, 5, 5A:
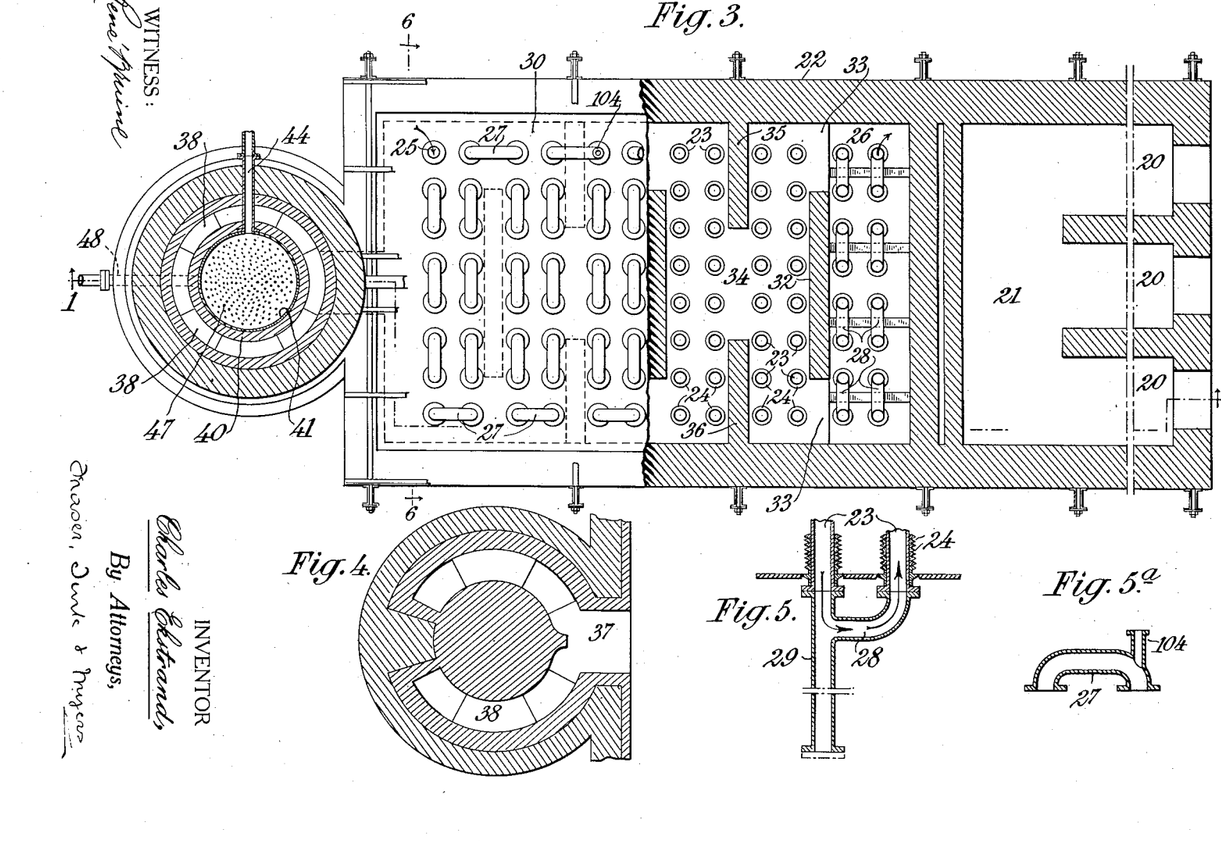

The firing, as above stated, is done at three separate fire-chambers or furnaces which discharge the heat and gases of combustion into the common chamber 21, from which chamber the heat strikes the first two rows of tubes, that is, considering them in the order of heat application; (but, if considered in the order of flowage of the material, they should be called the last two rows of tubes). The heat is then deflected by a center wall or baffle 32 (Fig. 3). Then it is caused to pass in two streams through the side passages 33 and engage the second two rows of tubes. The heat from the space surrounding this second set is caused by side walls or baffles 35, 36, to flow toward the center passage 34 between these side walls. This system of side and center passages produced by center and side baffle walls is carried on to the stack end of the heat chamber, the last two rows of tubes receiving the heat at the outer ends, which heat passes toward the center and enters the stack at the opening 37 (Figs. 1 and 4), from which the heat passes upwardly to the top 39 of the stack in the annular flue 38 between the stack lining and the fireproof lining of the expansion or mixing chamber 40. The condition of the fluid passing through the tube of the retort can be ascertained from time to time by means of suitable instruments connected at various desired points, as, for instance, by means of the flanges 104, illustrated in Fig. 5ª.

Figures 1, 1A, 2:
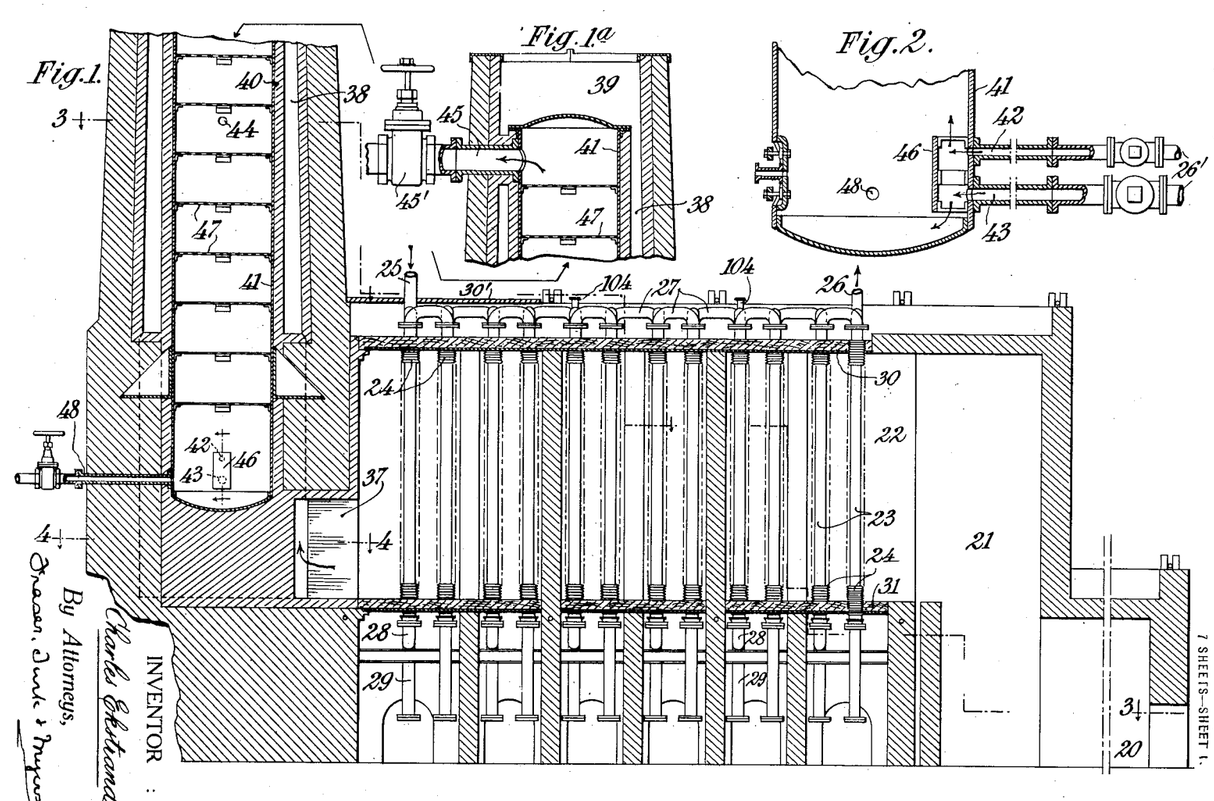

The expansion or mixing chamber 40 shown installed in the brickwork in Fig. 1 represents, by way of example, a steel shell 41 about four feet in diameter by thirty feet high, but any other size or proportion may be provided according to circumstances. The material under treatment issuing from the tubes of the retort is led into this chamber 40 preferably by suitable wrought-iron nozzles 42, 43, (Fig. 2) having suitable valve connections with pipes 26' from the outlets 26 of the retort tubes. As a matter of convenience, the material under treatment as delivered by the retort is hereinafter called vapor. The retort tubes in the present installation being assumed to be four-inch tubes, the nozzle 42 is proportioned to have a two and a half inch opening into the chamber 40 and the nozzle 43 to have a three-inch opening into such chamber. The vapor may also be led into this expansion or mixing chamber at a higher point by a nozzle having a four-inch opening at 44. The outlet for the vapor is shown in the form of a cast steel pipe 45 having a twelve-inch opening and located at the upper portion of the shell 41. A baffle-plate 46 is shown located inwardly of the discharge ends of the nozzles 42 and 43. A distance of ten inches from the nozzles gives good results. It should stand at right angles to the axes of the nozzles. In practice either one or both of these nozzles may be employed for introducing the vapor into this chamber. The vapor entering from the nozzles strikes the baffle-plate and the compression of the vapor at the time of entering into this chamber is controlled by shutting off one or the other of the nozzles as occasion demands, one of the objects of the process being to discharge vapor from the retort at a very high velocity.

The expansion or mixing chamber 40 is shown filled with a plurality of perforated cast-iron plates 47 which extend completely across the interior of the shell 41. The vapor arising through this chamber is compelled to pass through the perforations in these plates and to frequently change its direction of flow so that a most intimate commingling and mixing of the gaseous element of each vapor is effected during such passage. As the hot products of combustion in flue 38 surround this chamber in their passage through the stack, the vapor under treatment while contained in this chamber is kept at the maximum heat which was imparted to it in the retort. A valved outlet 48 is shown at the bottom of the mixing chamber through which can be drawn any liquid that may accumulate in this chamber, for instance, at the time of starting or after the operation has been stopped. When the apparatus is used as a topping or drying plant the liquid constantly collecting at the bottom of chamber 40 is drawn off through outlet 48.

The vapor passes from the expansion chamber through the pipe 49 (Fig. 16) either directly to the condenser coils by means of pipe 49o or to the dephlegmators 50, 51, presently to be described.

Figure 7:
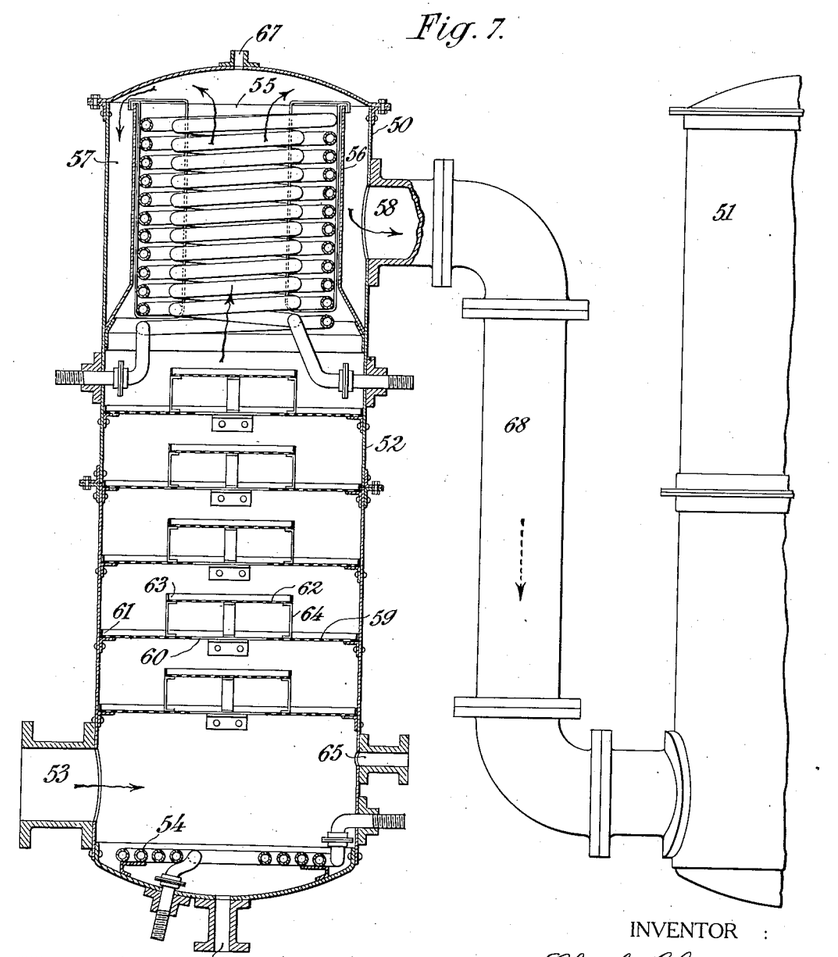
Fig. 7 illustrates the dephlegmators, one of these being shown partly in elevation and the other in central vertical section.

The dephlegmator illustrated at the right-hand side in Fig. 7 is formed of a shell 52 which for example, may be about ten feet high and about three and a half feet in diameter, although other sizes may be used, according to the capacity desired. The inlet is illustrated at 53, located near the bottom of the shell, below which inlet there is a steam coil 54. The upper portion of the shell contains a double cooling coil 55, such coil presenting a large amount of surface and being located within a shell 56 forming a gas pocket 57 communicating with the outlet 58, such vapor pocket being open at the top and closed at the bottom, whereby the gas, after passing over the coil, turns downwardly and enters this pocket, then passes out through the outlet 58 and from there by pipe 68 to the next portion of the apparatus, which may in some instances be a similar dephlegmator, 51.

The lower portion of the shell of the dephlegmator is provided with a plurality of deflectors, each of these comprising a perforated tray 59 extending to the edges of the shell 52 and having a central opening 60. The tray also has an upstanding flange 61 at its edge. A perforated tray 62 of larger area than the opening 60 is located above such opening. This tray also has an upstanding edge or flange 63 and is provided with feet or supports 64 holding the tray 62 elevated above the plane of the tray 59 and also substantially midway between the opening 60 in the tray upon which it rests and a similar opening in the tray above it.

Suitable outlets for accumulated liquid are provided, one at 65 near the bottom of the shell 52 and the other 66 at the bottom thereof. A connection 67 is provided at the top of the shell for thermometers, pressure gages, etc.

The operation of the dephlegmator is substantially as follows: The vapor enters at 53 and is intercepted by the deflectors or trays 59, 63, and in its passage through the perforations of these trays its elements are caused to thoroughly intermingle. It finally reaches the coil 55, which coil has passing through it water or some other cooling fluid which tends to somewhat chill the ascending vapor, causing the heavier portions of such vapor to condense and drop downwardly. The condensed portions in descending meet the ascending hot vapor. Any light molecules that accompany the liquid in its downward movement are heated by the ascending gases and rise and any heavy molecules conveyed by the vapor as it ascends are chilled by the descending liquid and accompany the same downwardly, thereby effecting a separation of the heavier from the lighter molecules. The gases constituting the vapor thus intermingled and freed from the heavier portions ascend to the top of the dephlegmator and pass over the division-plate or shell 56 and out through the outlet 58.

In operating this portion of the apparatus in practising this present process, if it is found that too much condensation is taking place steam from the steam main 105 is admitted into the coil 54 which increases the temperature of the liquid reaching the bottom and causes the lighter portions to ascend with the ascending vapor. The action, therefore, can be controlled very closely and as frequently as may be desired. The amount of separation desired controls the number of dephlegmators utilized at any particular time.

After passing through the dephlegmators, the vapor passes by means of a pipe 69 (Fig. 16) to the scrubber 70 presently to be described.

The scrubber illustrated in Figs. 8 and 9 comprises a steel shell 71 having a vapor inlet 72 at the bottom and a vapor outlet 73 at the top. Within the scrubber are located a plurality of trays 74 having perforated bottoms 75, into which trays may be placed some suitable material for having a scrubbing and also a catalytic effect, as, for instance, fullers' earth, bauxite, iron turnings, etc., the scrubbing effect separating the particles of carbon and the catalytic effect aiding the reconstruction of the hydrocarbon molecules and lessening the amount of free noncondensable gas which might occur.

A suitable connection is provided at 76 for pressure gages, thermometer, etc.

The vapor is led from the scrubber by means of a pipe 77 (Fig. 16) either to the condenser 81 to be condensed into liquid or to a compressor 78 which compresses the vapor to any desired pressure, and then into the condenser, so that the cooling may be done at any desired pressure.

Figure 11:
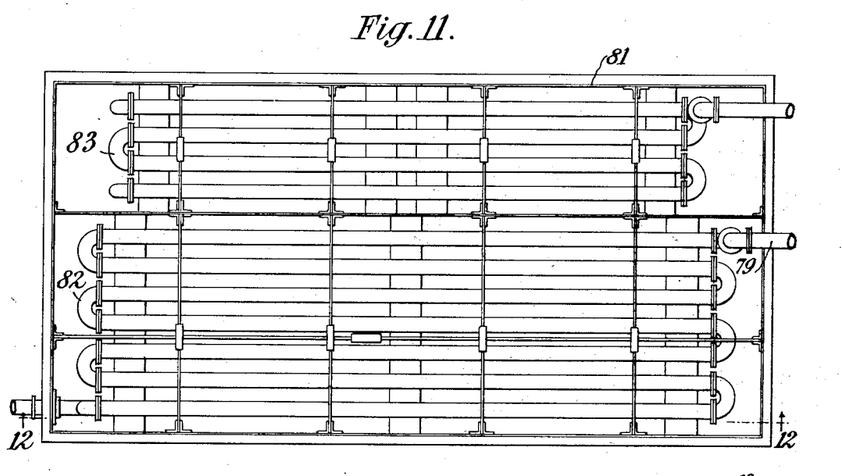
Fig. 11 is a plan view of a condenser.
Figure 12:
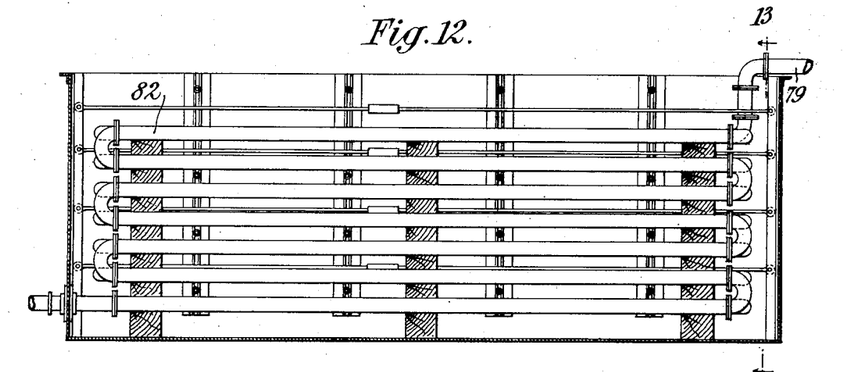
Fig. 12 is a vertical section thereof taken on a plane at about the line 12—12 of Fig. 11 and looking in the direction of the arrows.
Figure 13:
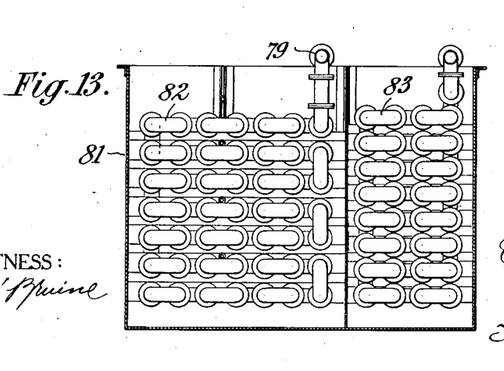
Fig. 13 is a cross-section taken at about the plane of the line 13—13 of Fig. 12 and looking toward the left-hand side, as indicated by the arrows.

The condenser illustrated comprises a box adapted to contain a cooling liquid, and in the box are located two series of coils 82, 83, one containing more piping and bends than the other, the longer coil, 82, being designed for cooling the vapor under pressure and the shorter coil, 83, for cooling any condensed material collected from the system, as required.

The vapor is led from the outlet 77 of the scrubber to the condensing coils 82 either through the compressor 78 or directly through the pipe 79, and after passing such coils enters the separator 84.

The separator illustrated in Fig. 10 comprises a cylindrical shell 85 about six feet high and about twelve inches in diameter. Somewhat above the bottom of this shell is the inlet 86 and slightly above the inlet is the liquid outlet 87, the top of the shell being provided with an outlet 88 having a connection for a safety valve, indicated diagrammatically at 89 in Fig. 16. The material under treatment enters the separator at the inlet 86 and forms a gas trap in the bottom of the shell 85 for the liquid outlet 87, the non-condensable gases passing out through the outlet 88. The liquid flowing from the outlet 87 preferably passes through a suitable trap 90, illustrated diagrammatically in Fig. 16. The safety valve 89 may be connected with the discharge 91, which is an outlet through which the entire plant can be drained when required.

Figure 14:
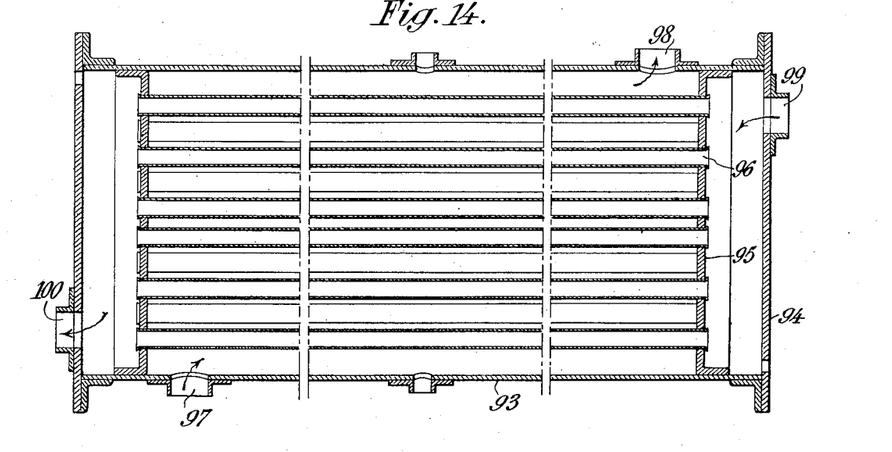
Fig. 14 illustrates a heat interchanger, the drawing showing a central section.
Figure 15:
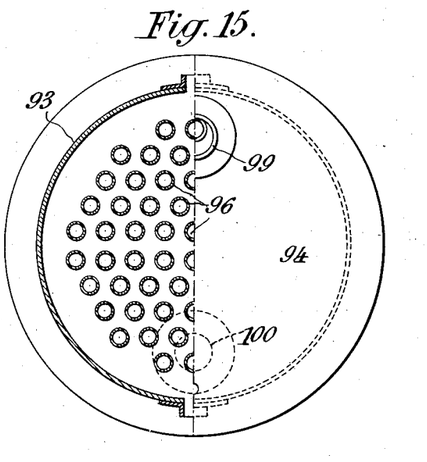
Fig. 15 is a view partly in end elevation and partly in cross-section, of the heat interchanger illustrated in Fig. 14.
Figure 16:
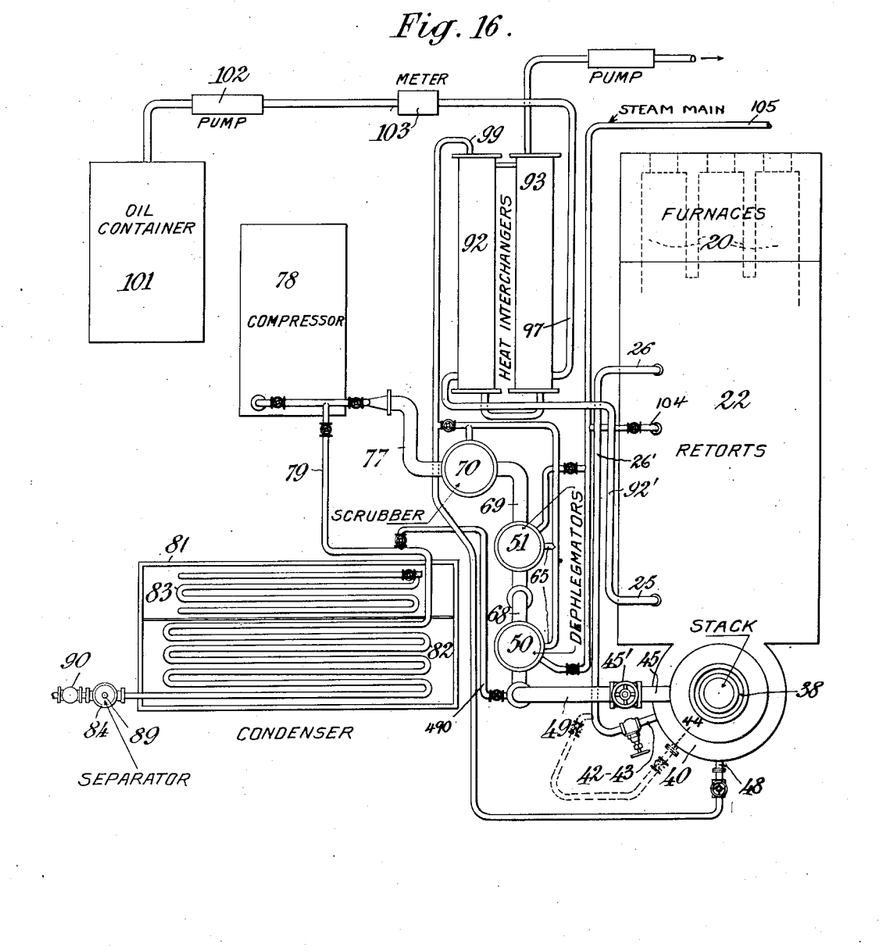
Fig. 16 is a diagram showing a plan of the entire plant and a convenient relative arrangement of the various elements entering into it.

A heat interchanger 92 is illustrated in Figs. 14 and 15 and its general relative position shown in the plan diagram, Fig. 16. In the present illustration I employ two of these heat interchangers. These heat interchangers are somewhat in the nature of horizontal tubular boiler construction and have a shell 93 provided with heads 94 and tube plates 95 which carry the tubes 96.

The crude material which is to be treated in the system is put in through an opening 97, preferably at the bottom of the shell 93 between the header-plates 95, and fills the chamber around the tubes and is passed out through the opening 98, preferably at the top. Hot material, such as the condensates from the dephlegmators and the scrubber, is passed in through the opening 99 through the tubes and out at the opening 100. This apparatus, therefore, acts as a cooler for the hot liquids and as a preheater for the material which goes to the retorts. The preheater illustrated may also be operated by passing the hot vapor through the tubes or around the tubes, and the liquid to be treated in the opposite direction. When using the apparatus as a topping or drying plant, all the hot oils coming from the bottom of mixer 40 pass through the heat interchangers before going to the cooling coils, thereby preheating the crude material.

In carrying out my improved process by aid of the apparatus herein illustrated, the material to be treated, which is supposed to be in the container 101 (Fig. 16), may be crude oil, fuel distillate, kerosene distillate, or anything of that sort, of any gravity, and is taken from the container 101 by means of a pump 102 and passed through a meter 103 and the heat interchangers 93, in which the material is preliminarily heated, and is then led by a pipe 92' to the inlet 25 of the retort 22.

In operating for cracking oil I have found that good results are accomplished by a temperature from 800° F. to 1200° F., depending on the material, at a pressure of about eighty pounds to the square inch accompanying such temperatures. The material upon passing through the retort is discharged at the outlet 26 and conveyed to the expansion or mixing chamber 40, the valves leading to the mixing chamber being preferably adjusted so as to give the vapor flowing into such chamber the greatest possible velocity. In the mixing chamber 40 can be kept the same pressure as in the retort; or it can be kept at atmospheric pressure, or at any point between this maximum and minimum, as is found to give the best result on the material handled. The temperature in this mixing chamber will be practically the same as the temperature of the material entering it, due to the manner in which the heat within the stack is applied to this mixing chamber.

The process is carried out in the presence of steam. Live steam is preferably added to the oil vapors in the retort at high pressure and high super-heat, a connection for the introduction of the steam being illustrated at 104, Fig. 1, being a branch on a bend 27, as illustrated in Fig. 5ª. The steam is preferably introduced about the middle of the retorts or at a point where all the oil has been gasified so as to obtain a thorough mixture between the steam and the oil vapors. In some instances it is found desirable to add water to the oil previous to its introduction into the apparatus, and by this means the steam is generated within the retorts.

The vapor comprising the gasified products of the oil under treatment, in passing into the mixing chamber at the high velocity, impinges against the baffle-plate 46, which has a tendency to produce a thorough initial mixing of the gases of the various component elements of the material under treatment and the steam, and also a thorough mixing of the dissociated hydrocarbon molecules. This mixture then rises through the various perforated trays 47, where, owing to the large size of the chamber and the comparatively long time required for the vapor to pass through it, and the intimate mixing produced by passing through the various perforated trays, a rearrangement and recombination of the hydrocarbon molecules is effected, producing combinations of a lighter order than it possessed before passing into the retorts, being more volatile and having a lower flash point.

The material under treatment passes from the mixing chamber by means of the pipes 45 and 49 through the dephlegmators 50, 51. The cooling medium passing through the coil 55 in the dephlegmator is adjusted so as to take out or condense all such gases as would not be volatile at a temperature of say 420 to 450° F. The dephlegmators can be adjusted to remove by condensation either more or less, the figures 420° to 450° F., being only given as illustrations. This leaves only the higher volatiles in a gaseous condition and obviates the necessity for redistillation after the cracking operation is finished and before the final treatment of the resultant product, which product may be gasolene or motor spirit, if the material treated is fuel distillate. The peculiar operation of the dephlegmator is above described and it is believed that a repetition of the detailed description at this point is unnecessary. In such description mention is made of an outlet for liquid condensed at the bottom of the dephlegmator and liquid also to be condensed at the bottom of the scrubber. Such liquids are used in the heat interchanger for preheating the incoming material for the retort and can then be either set aside and used for fuel oil or for lubricating purposes, if the oil is of that character, or it may be returned to the crude oil tank or container 101 and again passed through the apparatus until it is entirely cracked up.

The vapors passing from the dephlegmators enter the bottom of the scrubber and pass through the cleansing and catalytic medium and from there go directly either to the condenser 80 to be condensed into liquid, or, if found preferable to condense at a higher pressure than that obtained, to pass through the compressor 78 for that purpose, which is capable of compression to that pressure found most desirable.

The apparatus, in addition to the process above described in detail, can operate in several different ways. For instance:

I can, after cracking the oil, discharge the entire cracked material into the condensers, condensing it all, and then separating and treating it afterward, the same as can be done with crude oil.

The material may be passed through the dephlegmators and scrubber and directly to the condenser where the material is condensed at whatever pressure is on the material after passing through the apparatus, or the vapor can be passed through the compressor and condenser under any pressure desired. Owing to the construction of this apparatus the temperature in and the pressure on the retorts themselves are not related to each other, but can be varied within certain limits, as the first few rows of the retorts gasify the liquid, and the last rows superheat the gases, so that the resultant pressure depends a great deal on the speed at which the material is passed through.

The apparatus can be run maintaining the same pressure throughout the entire apparatus, or it can be run with the required pressure in the retorts, with atmospheric pressure in the mixing chamber and the dephlegmators and the scrubber, and then any required pressure on the condensers; or it can be run with a pressure on the retorts, a pressure on the mixing chamber, and atmospheric pressure on the dephlegmators and scrubber, and any required pressure on the condensers, as there is a valve 45' on pipe 45 which can be adjusted so as to vary the pressure between the mixer and the dephlegmators. By this means, any variation can be produced, depending on the material which is handled and the results sought for.

I can also use this apparatus as a topping system without any cracking, by simply heating the material passing through the retorts to whatever temperature is found necessary to take off a certain portion of the oil. For that purpose I would use the highest inlet into the mixing chamber, the inlet indicated at 44. The material thus entering the mixing chamber would be a mixture of liquid and gas, the liquid dropping to the bottom to be drawn off at the bottom of the mixing chamber and the gases passing directly to the condenser to be condensed, the material drawn off from the bottom of the mixing chamber passing through the heat interchangers to the extra cooling coils 83 of the condenser.

The apparatus may also be used for drying distillates of oil, maintaining a temperature sufficiently high to evaporate all moisture, leaving a dry distillate of oil which may be drawn off from the bottom of the mixing chamber.

In whatever manner this apparatus is employed it is capable of a continuous operation.

The following is the description of an operation according to the present invention, the material employed being crude distillate from Mexican crude oil, the distillate having a gravity of 28.4 and containing some difficultly refinable portions and water, this distillate analyzing substantially as follows:

Initial boiling point 303° F.
Off at 338° F., 2%.
Off at 356° F., 3%.
Off at 400° F., 7%.
Off at 425° F., 14%.

By employing the above described process and apparatus and using a temperature of between 1150 and 1200° F., at the outlet of the last tube of the retort and an average pressure of about 80 pounds per square inch in the retort, permitting the vapor to escape into the mixer and from the mixer through the dephlegmators and the scrubber, maintaining a pressure of between 10 and 20 pounds per square inch in these, and compressing the vapor which does not condense in the dephlegmators and the scrubber, discharging the compressed vapor into the condenser at a pressure of about 60 pounds per square inch and condensing the same in the condenser, I have produced from the material above described a material having a gravity of 38.5 Baumé, an initial boiling point of 93° F., and distilling off as follows:

Off at 160° F., 7%.
Off at 212° F., 15%.
Off at 302° F., 30%.
Off at 338° F., 40%.
Off at 356° F., 45%.
Off at 400° F., 59%.
Off at 425° F., 71%.

This 71 per cent. is 44.2 gravity Baumé. In this particular example it is to be noted that I have taken the material having a gravity of 28.4 and brought it up to a gravity of 38.5, and that in the material which contained only 14 per cent. of evaporative material at 425° F. I have made a material of which 71 per cent. will evaporate at a temperature of 425° F. This although taken from actual commercial operations, is nevertheless given as an illustrative example of carrying out my improved method by means of the apparatus herein illustrated. Of course it is to be understood that changes may be made within the scope of the claims without departing from the spirit of the invention.

I claim:

1. An oil-treating apparatus comprising a retort, means for forcing oil therethrough under pressure, an expansion and mixing chamber, a baffle plate therein, two contracted nozzles of different sizes having valves for admitting the vapors from the retort through either nozzle into said chamber, said nozzles arranged to project said vapors against said plate.

2. An apparatus for treating oil, comprising means for vaporizing the oil, an expansion chamber in communication with the heating means, a dephlegmator connected with the expansion chamber and adapted for causing the expanded vapor to move upwardly in a column, means at the upper portion of the dephlegmator for chilling the vapor, means at the lower portion of the dephlegmator for heating and regasifying the condensate from the chilling means, a scrubber in communication with the dephlegmator for removing carbon particles and ungasified hydrocarbon elements, and a condenser in communication with the scrubber.

3. An apparatus according to claim 2, embodying means for compressing the scrubbed gas and passing the same to the condenser.

4. An apparatus for treating oil comprising a retort having a heat box provided with a passage for the heat, a furnace at one end of the heat box and a stack at the other end thereof, a chamber located in the stack, a pipe located in the heat box and having its inlet at the stack end and its outlet at the furnace end of the heat box, the said outlet being connected to the said chamber.

5. An apparatus according to claim 4 wherein the inlet to the mixing chamber comprises two pipes of different diameter, connected to the retort outlet and provided with valves.

6. An apparatus according to claim 4 wherein the inlet to the mixing chamber comprises two pipes of different diameter, connected to the retort outlet and provided with valves, and a baffle plate within the mixing chamber located in front of the openings of the said pipes.

7. An apparatus for treating oil comprising a retort, a furnace at one end of such retort, and a stack at the other end thereof, a chamber located in said stack, the outlet of the retort being at the furnace end and connected to the chamber, said chamber being provided with an outlet and an inlet, the outlet being larger than the inlet, the apparatus being so constructed that the temperature and pressure in the chamber is lower than the temperature and pressure at the outlet of the retort.

8. An apparatus according to claim 7 embodying means for admitting steam to the retort intermediate of its stack portion and furnace portion.

In witness whereof, I have hereunto signed my name.

CHARLES EKSTRAND.